INVENTORS
F. C. WILLIAMS
TOM KILBURN
G. R. HOFFMAN

BY

Stevens, Davis, Miller & Mosher

ATTORNEYS

INVENTORS
F. C. WILLIAMS
TOM KILBURN
G. R. HOFFMAN
BY
Stevens, Davis, Miller & Mosher
ATTORNEYS April 12, 1960 F. C. WILLIAMS ET AL 2,932,763

ELECTROSTATIC INFORMATION STORAGE

Filed Dec. 6, 1954 4 Sheets-Sheet 3

INVENTORS
F. C. WILLIAMS
TOM KILBURN
G. R. HOFFMAN
BY
Stevens, Davis, Miller and Mosher
ATTORNEYS

ELECTROSTATIC INFORMATION STORAGE

Filed Dec. 6, 1954

INVENTORS

Frederic C. Williams
Tom Kilburn
George R. Hoffman
By: Stevens, Davis, Miller & Mosher
ATTORNEYS United States Patent Office 2,932,763

Patented Apr. 12, 1960

2,932,763

ELECTROSTATIC INFORMATION STORAGE

Frederic Calland Williams, Romiley, and Tom Kilburn and George Richard Hoffman, Manchester, England, assignors to National Research Development Corporation, London, England Application December 6, 1954, Serial No. 473,360

Claims priority, application Great Britain December 11, 1953

10 Claims. (Cl. 315—8.5)

Figure 1:
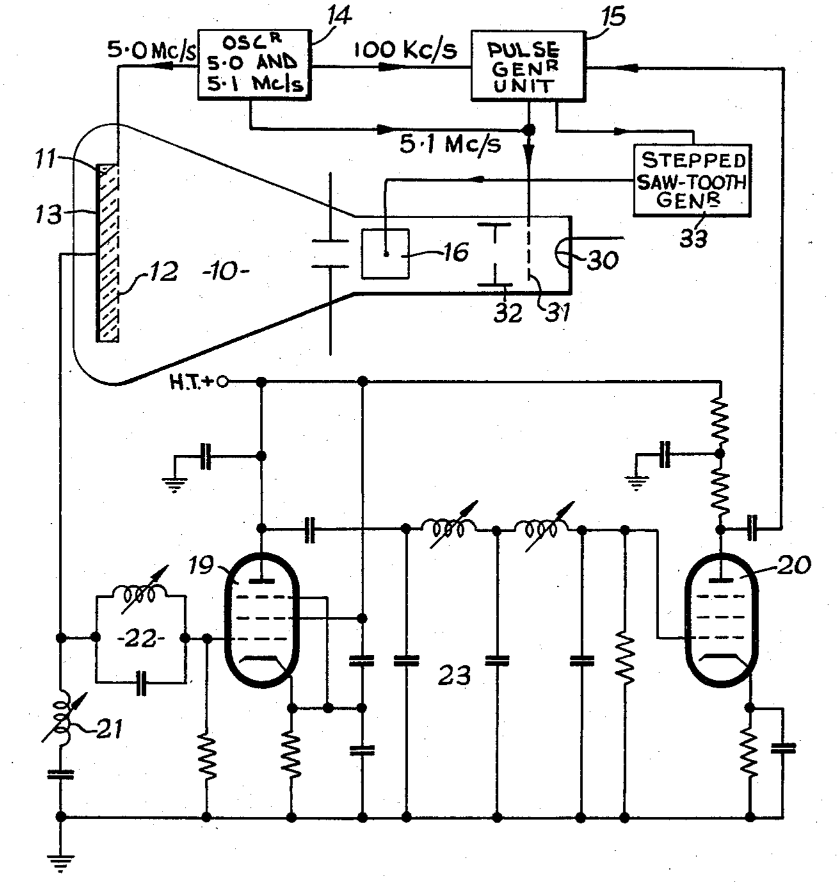

The present invention relates to the storage of information, particularly digital information, using a cathode ray tube, in which the information is stored in the form of different charge conditions on elemental areas of a charge-retaining storage surface within the tube.

In the specification of co-pending application Serial No. 50,136, for example, there is described a method of storage in which each digit interval (that is the time allotted to the storage of a digit) is divided into two parts. During the first part the elemental area is bombarded with the cathode ray beam in order to read the information stored on the area by generating in a signal plate electrostatically coupled to the storage surface a signal representative of the state of charge of the area. The second part of each digit interval is allotted to modifying, when required by the nature of the information to be stored on the elemental area, the state of charge left on that area after the bombardment thereof by the beam. The signal generated in the signal plate may be used to determine whether the state of charge left on the area after the first bombardment is changed or not, thereby regenerating the charge condition which the area had before the bombardment. Alternatively the information read during the first part of a digit interval may be fed to a computer and the decision whether the area is to be bombarded during the second part of the digit interval or not may then be determined by a signal received from the computer.

In the aforesaid prior specification the bombardments during the two parts of a digit interval take place upon different parts of the storage surface: in one example two adjacent areas and in another example a relatively large area during the first part of the digit interval and a small area within the outer boundaries of the relatively large area during the second part of the digit interval. Such arrangements have the disadvantage that the elemental area which bears the state of charge representing the information stored is not the whole "digit" area bombarded during a digit interval.

Since the digit areas (that is the areas that receive bombardment) have to be spaced apart by a distance sufficient to prevent mutual interference between adjacent elemental areas, it is obviously desirable that the digit areas should be as nearly co-extensive as possible with the elemental areas.

The present invention has for its principal object to provide an improved method and means for storage of information in which each elemental area is co-extensive with the corresponding digit area, that is to say the elemental area which bears the characteristic charge from which the read signal is derived is the only area bombarded during each digit interval.

According to the present invention there is provided a method of storing digital information upon an electric charge-retaining storage surface in a cathode ray tube and of reading such information in which the potential to which an elemental area of the surface is charged upon bombardment of the area with the cathode ray beam is determined by the potential of an electrode in or near the surface and on the bombarded side thereof, the method comprising bombarding the area with the beam while applying to the said electrode a first potential or range of potentials, thereby producing on the area a charge representative of one digit, when required to store a different digit on the area carrying out a second bombardment of the area with the beam while applying to the electrode a second potential or range of potentials different from the first potential or range of potentials, thereby producing on the area a charge representative of the different digit, and, in order to read the stored information, bombarding the area with the beam whilst applying to the said electrode the first potential or range of potentials, thereby generating in a signal plate capacitively coupled to the said surface a voltage representative of the digit stored on the area.

The invention also provides a method of storing digital information upon an electric charge-retaining storage surface in a cathode ray tube and of reading such information in which the potential to which an elemental area of the surface is charged upon bombardment of the area with the cathode ray beam is determined by the potential of an electrode in or near the surface and on the bombarded side thereof, the method comprising directing the cathode ray beam successively upon a number of elemental areas on the surface, the beam being held directed upon each such area for the duration of a digit interval, bombarding each area with the beam during a first part of each digit interval, while applying to the said electrode a first potential or range of potentials, in order to produce on the area a charge representative of one digit and to generate in a signal plate capacitively coupled to the said surface a voltage representative of the charge upon the area before the said bombardment thereof, and, when required to store a different digit on the area, bombarding the area during a later part of the digit interval while applying to the electrode a second potential or range of potentials different from the first potential or range of potentials. The said electrode will be referred to hereinafter for convenience as the mesh.

When the beam bombards the storage surface, secondary electrons are released from the area to the mesh until the area assumes a potential close to that of the mesh and hence the charge assumed by the elemental area bombarded is determined by the potential of the mesh. By varying the potential of the mesh, therefore, the potential of the elemental area produced by bombardment thereof is varied.

If an elemental area is bombarded, as described, only during the first part of a digit interval, substantially no signal (apart from those due to the introduction and removal of the cloud of electrons in the neighbourhood of the area) is generated in the signal plate when the beam next bombards the area. If, on the other hand, the area has been bombarded, as described, during the later part of the digit interval, when next the area is bombarded by the beam a signal will be generated in the signal plate. It is immaterial whether the mesh potential during the first part of a digit interval is the higher or the lower.

When regeneration is required, the signal generated in the signal plate during the first part of the digit interval can be used to determine whether the bombardment during the later part of the digit interval is to take place or not and hence whether the charge left on the area during the first bombardment is to be changed or not.

If different steady potentials are applied to the mesh a difficulty arises because the change in potential has to be considerable, for instance tens of volts, and the changes have to take place rapidly for high speed operation. The result is that large and sudden voltage changes are induced in the signal plate and are passed to the amplifier connected to the signal plate, where they tend to overload the amplifier and also to obscure the "read" signals generated in the signal plate. These large voltage changes cannot readily be filtered out.

In order to overcome this difficulty the effect required is produced by applying high frequency oscillations to the mesh and to the control grid or cathode of the cathode ray tube, the relative phase of the two oscillations during the first and the later part of each digit interval respectively differing by about 180°. The oscillation on the control grid or cathode is arranged to switch the beam on and off. Consequently when the two oscillations are in one phase relation the beam is switched on while the positive peaks of the high frequency oscillation are applied to the mesh and when the two oscillations are in the opposite phase relation the beam is switched on while the negative peaks of the high frequency oscillation are applied to the mesh.

The required change in phase relation is conveniently obtained by feeding to the mesh and to the control grid or cathode two oscillations of slightly different frequency, the beats between the two oscillations having a period equal to the recurrence period of the digit intervals.

Although, as will be evident to those skilled in the art, many different forms of apparatus for carrying the method of the invention into effect can be devised, the invention also provides a preferred form of such apparatus as set forth in appended claims.

Figure 2:
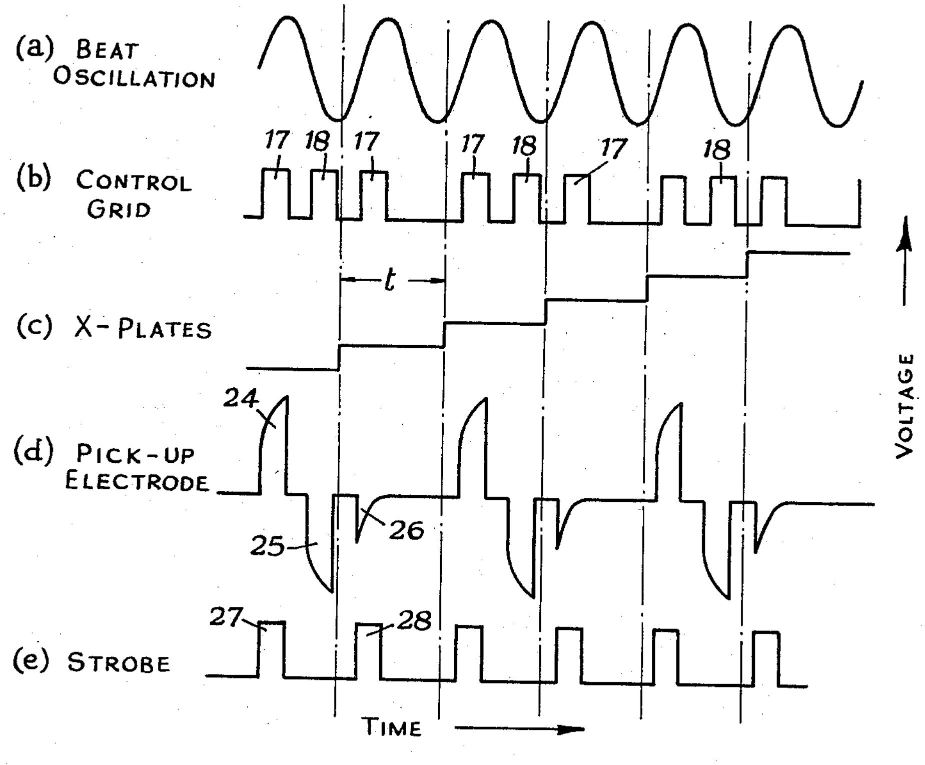
Figure 3:
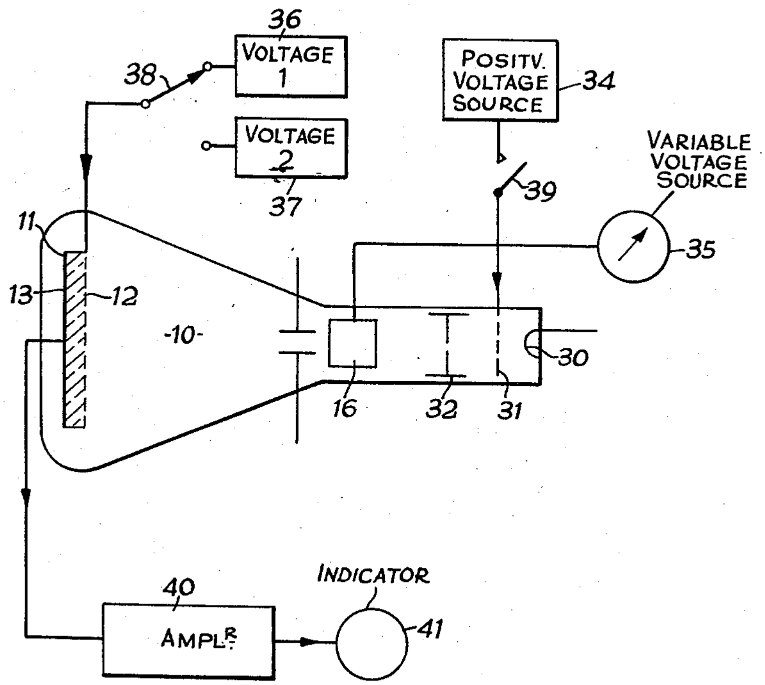
Figure 4:
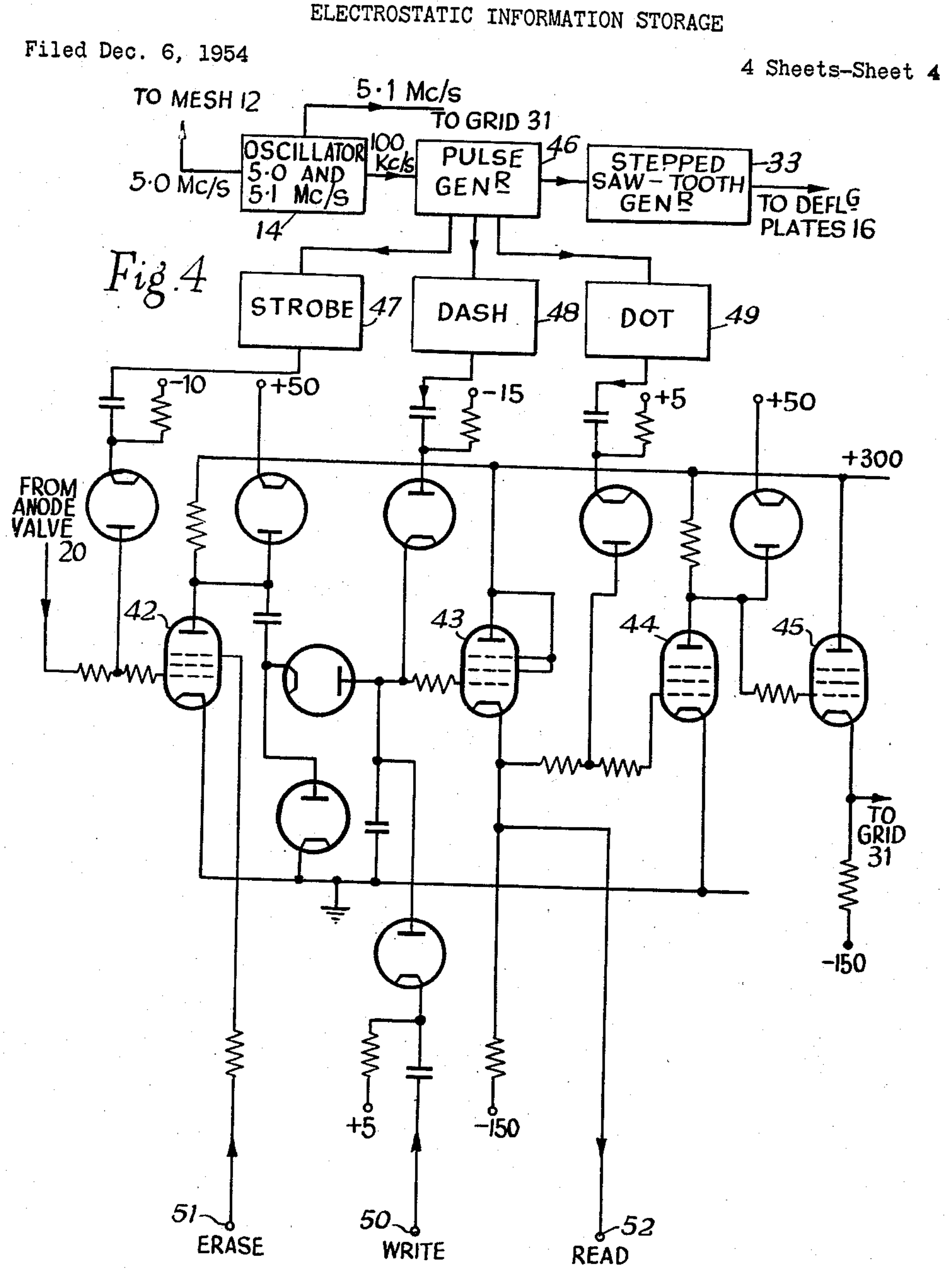
Figure 5:
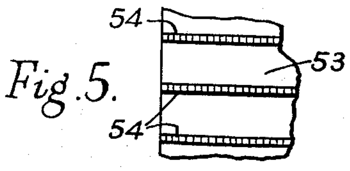
Figure 6:
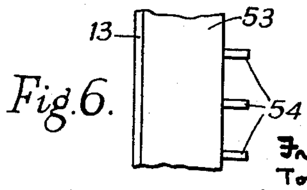

The invention will be further described with reference to the accompanying drawings in which Fig. 1 is a circuit diagram of a preferred form of apparatus according to the invention, Fig. 2 contains waveforms present in the circuit of Fig. 1, Fig. 3 is a circuit diagram illustrating the basic principles of the invention, Fig. 4 is a circuit diagram showing one form that the pulse generator unit of Fig. 1 may take, and Figs. 5 and 6 are much enlarged views in front and side elevation respectively of a fragment of the cathode ray tube screen in Fig. 1.

Referring first to Fig. 3, a cathode ray tube 10 has a screen comprising an insulator 11 (much exaggerated in thickness), a mesh 12, and a pick-up plate 13. Electrons from a cathode 30 are formed into a beam by an electrode system represented diagrammatically at 32 and strike the screen 11. The beam is normally switched off and can be switched on by closing a switch 39 to apply a suitable positive potential from a source 34 to a control grid 31. A variable voltage source 35 coupled to a deflector plate 16 enables the cathode ray beam to be deflected to desired positions on the screen 11. Two different voltages 1 and 2 can be applied to the mesh 12 from sources 36 and 37 by operating a switch 38.

In operation, one digit (say "0") can be recorded upon a digit area selected by adjusting the control of source 35 by momentarily closing the switch 39 while the switch 38 is set, as shown, to apply voltage 1 to the mesh. The area bombarded then assumes a potential close to that of the mesh 12. In order to read the information stored on this area, the switch 39 is again momentarily closed with the switch 38 in the position shown, that is with voltage 1 on the mesh 12. Since the potential on the area of the screen 11 bombarded will not be substantially changed by this operation, a negligible voltage change takes place in the pick-up plate 13 which is coupled through an amplifier 40 to an indicator 41. Thus the indicator 41 gives no indication and indicates that the stored digit is "0."

In order to record a different digit (say "1") on a selected area, the switch 39 is momentarily closed with the switch 38 set, as shown, to voltage 1. The switch 38 is then moved to its other position to put voltage 2 on the mesh 12 and the switch 39 is again momentarily closed. The potential of the area bombarded then changes to a value close to voltage 2. In order to read the information stored on this area, the procedure is, as before, to close the switch 39 momentarily with the switch 38 in the position shown, namely with voltage 1 on the mesh. The effect will be to change the potential on the area bombarded from a value close to 2 to a value close to 1 and a corresponding voltage pulse is generated in the pick-up plate 13 and indicated at 41.

The operation described is obviously too slow for use in computers and a preferred form of apparatus suitable for high speed operation is shown in Fig. 1 in which like parts have the same reference as in Fig. 3.

In Fig. 1, oscillations of 5.0 and 5.1 mc./s. from a generator 14 are applied to the mesh 12 and the control grid 31 of the tube 10 respectively. A pulse generator unit 15 is adapted to generate positive-going dot and dash-extension pulses which are locked to the 100 kc./s. beat between the 5.0 and 5.1 mc./s. oscillations and applied to the control grid of the tube 10 to bias the control grid to a potential at which the cathode ray beam is switched on during the positive peaks of the 5.1 mc./s. oscillation. In the absence of a dot or dash-extension pulse, the radio frequency oscillation is incapable of switching on the beam.

A stepped waveform as shown at (*c*) in Fig. 2 is applied from a stepped saw-tooth oscillation generator 33 synchronised by pulses from 15 to X-deflecting plates 16. Each of the horizontal portions of the waveform (*c*) defines an elemental area on which a digit is stored and its duration $t$ defines a digit interval.

The 100 kc./s. beat oscillation between the two radio frequencies from the generator 14 is shown at (*a*) in Fig. 2. The pulse generator unit 15 is capable of generating dot pulses 17 which are applied continuously to the control grid and dash-extension pulses 18 which are applied selectively to the control grid. The bright-up waveform of Fig. 2(*b*) represents the waveform required in order to store dots and dashes (or "0" and "1") on alternate elemental areas.

The pulses from generator unit 15 are locked in step with the 100 kc./s. beat between the oscillations from 14 and with the stepped waveform (*c*) in Fig. 2 in such a manner that the dot pulses 17 occur during the first part of each digit interval and the dash-extension pulses 18 occur during the later part of each digit interval.

The pick-up plate 13 is coupled by a loop circuit including an amplifier comprising valves 19 and 20 and the pulse generator unit 15 to the control grid of the tube 10. This loop circuit may be constituted as described in United States application Ser. No. 124,192, filed October 28, 1949, by Frederic C. Williams et al. Thus as shown in Fig. 4, the anode of valve 20 is connected to the input of a circuit comprising four valves 42, 43, 44 and 45. Pulses from a pulse generator 46 locked in synchronism with the beat frequency of the oscillator 14 are applied to synchronise the stepped saw-tooth generator 33, a strobe pulse generator 47 generating the pulses of Fig. 2(*e*), a dash-extension pulse generator 48 generating the pulses 18 in Fig. 2(*b*), and a dot pulse generator 49 generating the pulses 17 in Fig. 2(*b*). In order to write a "1" a suitably timed negative pulse is applied to a write terminal 50. In order to write a "0" over an existing "1" a suitably timed negative pulse is applied to an erase terminal 51. Output may be obtained for example from a read terminal 52. The circuit of Fig. 4 is described in more detail in U.S. application Ser. No. 124,192 referred to above.

The amplifier shown in Fig. 1 contains means for suppressing the radio frequency oscillations from the generator 14 applied to the mesh 12. The means, in the embodiment shown, are an acceptor circuit 21 and a rejector circuit 22 both tuned to 5 mc./s. and a $\pi$ filter 23 connected between the valves 19 and 20 and designed to suppress the 5 mc./s. frequency.

Assuming that the charge conditions on the screen are those produced by the bright-up waveform shown in Fig. 2(*b*) and that during the scan to be considered these charge conditions are to be read (using the waveform of Fig. 2(*b*)) and regenerated, when the first pulse 17 occurs the potential of the area bombarded has to be raised because during the previous scan the area was last bombarded during the later part of the digit interval and was therefore left at the lower potential. This pulse, therefore, gives rise on the pick-up plate 13 to a positive pulse 24 in Fig. 2(*d*). The first pulse 18 occurs during the later part of the first digit interval and the reduction in potential of the area bombarded gives rise to a negative pulse 25 on the pick-up plate.

When the second pulse 17 of Fig. 2(*b*) occurs the area bombarded is at the higher potential since during the previous scan of this area no bright-up pulse 18 occurred. Consequently only a small negative pulse 26 is produced in the pick-up plate.

Pulses from the strobe pulse generator 47 of Fig. 4 select from the waveform of Fig. 2(*d*) only the parts occurring during the strobe pulses. Thus strobe pulse 27 selects a positive pulse which when fed to the control grid of the valve 42 in Fig. 4 releases a dash-extension pulse 18 which is applied to the control grid 31 of the tube 10, thus regenerating the original charge condition on the area. The strobe pulse 28 strobes only the small negative pulse 26 and this has no effect on the circuit 15 of Fig. 1 and consequently a dash-extension pulse is not passed to the control grid of the tube 10. Here, again, therefore, the original state of charge is regenerated.

When the beam is switched on by the peaks of the high frequency oscillation for the duration of a dot or a dash interval, the potential of the area bombarded approaches its full value (that which it would assume if the bombardment continued indefinitely) asymptotically. For a given duration of the bombardment the closeness of approach to the full value depends on the beam current which is always limited. Thus, in general, with high speed operation such as is usually required, the area does not assume the full value of potential. The potential attained in order to represent one digit will, therefore, not be constant but will depend to some extent on whether the same or a different digit was previously stored on the area.

In order to make the approach to the full value as close as possible, having regard to speed of operation and beam current, it is preferably arranged, as shown in Figs. 2(*a*) and (*b*), that the radio frequency oscillation is applied to the mesh during the whole of each quarter cycle of the beat frequency preceding the peak value thereof. It is clearly undesirable that the beam should be switched on after these peak values. Even though the earlier part of the quarter cycle referred to does not have much effect in comparison with the effect produced by the later part, nevertheless it does make a contribution to the final potential attained by the area.

Instead of applying the high frequency oscillations continuously to the cathode ray tube and biasing the tube into operation by means of the dot and dash extension pulses as described, the tube may be biased permanently into a condition to be switched on by high frequency oscillations applied to its control grid or cathode and the high frequency oscillations may be applied to the control grid or cathode in bursts at the times of occurrence of the dot pulses and (when required) of the dash extension pulses. The high frequency oscillations may be applied continuously to the mesh.

The mesh is arranged close to the bombarded surface of a charge-retaining screen and may be in contact with the surface. A suitable screen provided with a mesh is described in United States patent application Serial No. 473,359, filed on the same date as the present application.

The screen may as shown in Figs. 5 and 6, be a fluorescent screen or it may be a separate element, such for example as a sheet of mica 53, supported within the tube. The mesh as shown in Figs. 5 and 6 consists of a single set of parallel conducting strips 54. The strips should be as narrow as possible consistent with their ohmic resistance being low enough. Their spacing should be such that the spot produced thereon by the cathode ray beam covers at least three of the parallel strips. Alternatively two sets of strips such as 54 arranged perpendicular to one another to form a grid may be used.

Although preferred ways of carrying out the invention have been described, it may be carried out in many other ways.

According to one such way, a sinusoidal oscillation of, for example, 100 kc./s., is applied to the mesh, the beam being stationary for a digit interval which includes at least a substantial part of a positive and a negative half-cycle of the oscillation, and being moved forward between digit intervals. In order to record one digit the beam is switched on or intensified only during the first part of the digit interval, while either the positive or the negative half-cycle is driving the mesh. In order to record another digit, the beam is switched on or intensified, or kept switched on or intensified, during the second part of the digit interval, while the negative or positive half-cycle, respectively, is driving the mesh. Whether the beam is switched on or intensified during the second part of a digit interval may be determined by the signal generated in the pick-up plate, when regeneration is required, or by a write signal.

As already explained, means must be provided for suppressing the 100 kc./s. component in the output of the pick-up electrode in order to avoid overloading the amplifier and masking the desired signals. For this purpose a circuit such as that described with reference to Fig. 1 may be used. Alternatively a form of bridge circuit may be included in which the mesh-pick-up plate capacitance forms one element, the bridge circuit serving for application of the 100 kc./s. oscillation to the mesh and to balance out oscillations of this frequency at the pick-up plate. The oscillation should be as free as possible from harmonic content and care should be taken in designing the bridge circuit to avoid the use of elements, such as ceramic capacitors, which may introduce non-linearity. It is also important to arrange, in all embodiments, that the impedance of the mesh to ground should be low.

Another way of carrying out the invention is to use two oscillations of the same frequency which is many times the digit recurrence frequency; for example the frequency may be 5 mc./s. One of the oscillations is applied to the mesh and the other to a beam intensity control electrode, for instance the cathode. During the first part of each digit interval the oscillations are in at least approximately the same phase and during the other part of each interval at least approximately in anti-phase. A write signal or, for regeneration, a signal from the pick-up plate is applied to determine whether the oscillation is applied to the cathode during the later part of each digit interval or not, the cathode ray beam being arranged to be cut off in the absence of the oscillation. The oscillations may be applied to the cathode through two gating pentodes in parallel, oscillations in one phase being applied to the control grid of one and in the opposite phase to the control grid of the other. Square waves of digit recurrence frequency and opposite phase are applied to the respective suppressor grids.

The 5 mc./s. oscillations may be suppressed in the circuit between the pick-up plate and the amplifier as described with reference to Fig. 1.

The present invention can be used in conjunction with that set forth in United States application Serial No. 273,114, filed February 23, 1952 by G. I. Thomal et al., in which after reading the information on an elemental area the beam is moved backwards to modify (when required) the charge on an elemental area previously read.

Moreover the clamping and integrating circuits set forth in United States application Serial No. 175,794, filed July 25, 1950, by F. C. Williams et al., now Patent No. 2,727,988, issued December 20, 1955, are advantageously used in conjunction with the present invention.

We claim:

1. A method of storing digital information upon an electric charge-retaining storage member in a cathode ray tube, the storage member having an electron-permeable electrode upon the side thereof bombarded by the cathode ray beam of the tube, the method comprising the steps of storing a first digit on one elemental area on said member by bombarding the area with the cathode ray beam while applying a first potential to said electrode, and storing a second digit on another elemental area on said member by first bombarding said other area with said beam while applying said first potential to said electrode and subsequently bombarding said other area with said beam while applying to said electrode a second potential different from said first potential.

2. A method according to claim 1, wherein said potentials are oscillatory.

3. Apparatus for storing digital information comprising a cathode ray tube, electron beam-producing means, beam-deflecting means, beam-intensity control means and a charge-retaining storage member in said tube, said member having a storage surface positioned to be bombarded by said beam, an electron-permeable electrode on the side of said member facing said beam-producing means, a stepped saw-tooth oscillation generator, means coupling said generator to said beam-deflecting means, pulse-generating means, means generating two different potentials, circuits connecting said pulse-generating means to said beam intensity control means and said potential-generating means to said electron-permeable electrode respectively, and switching means in at least one of said circuits responsive to information to be stored.

4. Apparatus according to claim 3, wherein said pulse-generating means generate two sets of recurrent pulses, one set occurring during an early part of each step of the waveform from said saw-tooth generator and the other set occurring during a later part of each said step, and wherein said switching means are in the circuit connected to said pulse-generating means to permit and prevent the application of the second-named set of pulses to said beam-intensity control means.

5. Apparatus for storing digital information comprising a cathode ray tube, electron beam-producing means, beam-deflecting means, beam intensity control means and a charge-retaining storage member in said tube, said member having a storage surface positioned to be bombarded by said beam, an electron-permeable electrode on the side of said member facing said beam-producing means, oscillation generating means coupled to said electron-permeable electrode and to said beam-intensity control means and applying to said electrode and control means respectively oscillations in a first phase relation followed by a second phase relation, said phase relations differing by approximately 180°.

6. Apparatus for storing digital information comprising a cathode ray tube, electron beam-producing means, beam-deflecting means, beam intensity control means and a charge-retaining storage member in said tube, said member having a storage surface positioned to be bombarded by said beam, an electron-permeable electrode on the side of said member facing said beam-producing means, oscillation generating means coupled to said electron-permeable electrode and to said beam-intensity control means and applying to said electrode and control means respectively two oscillations of frequencies differing from one another by an amount which is a small fraction of the frequency of each of said oscillations.

7. Apparatus according to claim 6, comprising pulse-generating means coupled to said beam-intensity control means and to said oscillation-generating means to lock the pulses generated by the pulse-generating means to the beat frequency between said two oscillations.

8. Apparatus according to claim 7, comprising a stepped saw-tooth oscillation generator coupled to said beam deflecting means and to said pulse generating means to lock the stepped waveform from said saw-tooth generator to said beat frequency.

9. Apparatus according to claim 8, wherein said pulse-generating means generates two sets of recurrent pulses, pulses of one set occurring during an early part of each step in the waveform from said saw-tooth generator and pulses of the other set occurring during a later part of each said step, and wherein there are provided means responsive to information to be stored to suppress, when appropriate, pulses of said other set.

10. Apparatus according to claim 3, comprising signal pick-up means capacitively coupled to said storage surface and means coupling said pick-up means to said switching means whereby charges on said surface are regenerated.

References Cited in the file of this patent

UNITED STATES PATENTS

| | | |
|---|---|---|
| 2,454,410 | Snyder | Nov. 23, 1948 |
| 2,589,460 | Tuller | Mar. 18, 1952 |
| 2,639,425 | Russell et al. | May 19, 1953 |
| 2,671,607 | Williams et al. | Mar. 19, 1954 |
| 2,706,246 | Klemperer | Apr. 12, 1955 |